No. 830,793. PATENTED SEPT. 11, 1906.
S. W. LANHAM.
SHAFT SUPPORT.
APPLICATION FILED OCT. 23, 1905.
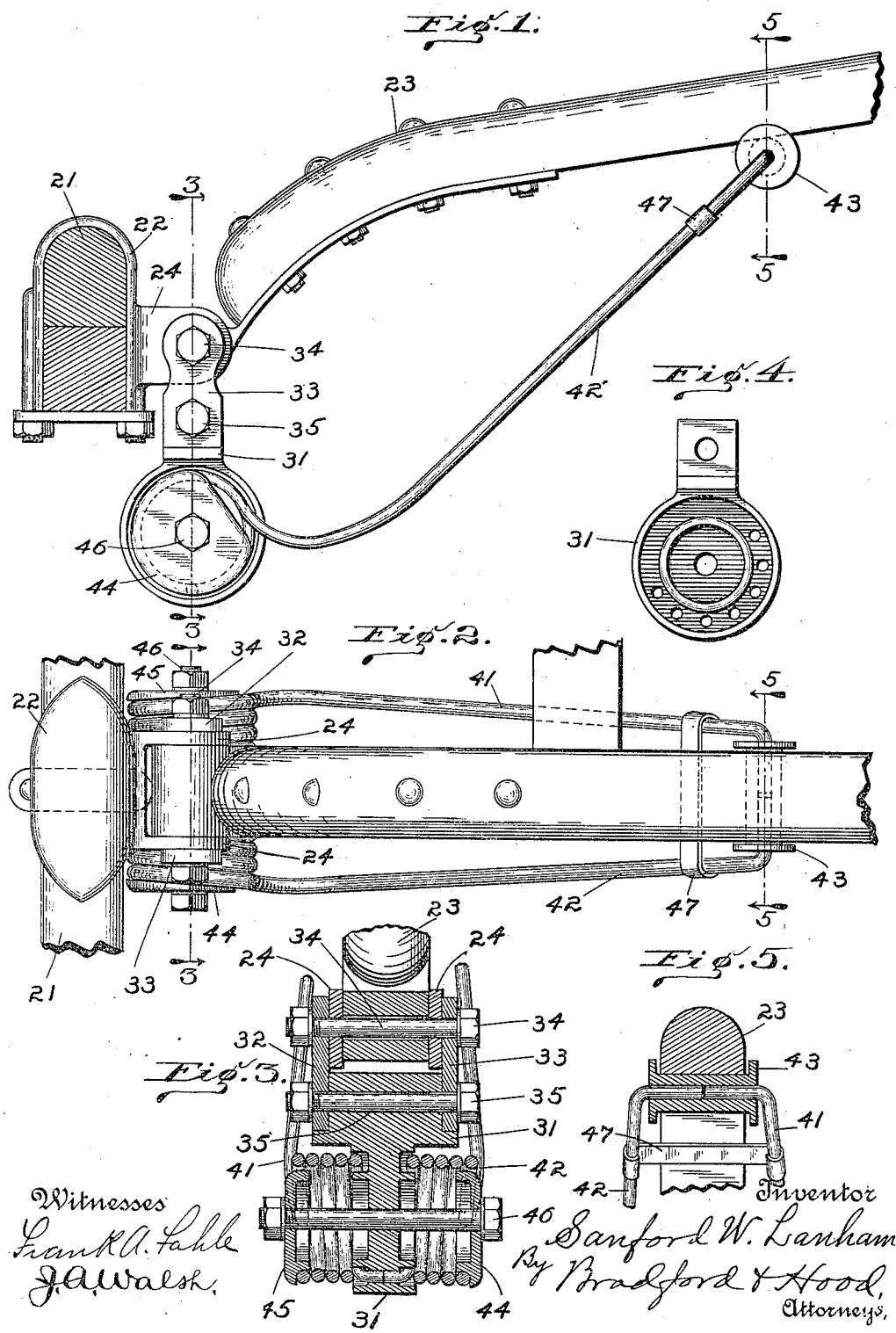

UNITED STATES PATENT OFFICE.

SANFORD W. LANHAM, OF INDIANAPOLIS, INDIANA, ASSIGNOR, BY DIRECT AND MESNE ASSIGNMENTS, TO IDEAL SHAFT SUPPORT CO., OF INDIANAPOLIS, INDIANA, A CORPORATION OF INDIANA.

SHAFT-SUPPORT.

No. 830,793.     Specification of Letters Patent.     Patented Sept. 11, 1906.

Application filed October 23, 1905. Serial No. 284,103.

*To all whom it may concern:*

Be it known that I, SANFORD W. LANHAM, a citizen of the United States, residing at Indianapolis, in the county of Marion and State of Indiana, have invented certain new and useful Improvements in Shaft-Supports, of which the following is a specification.

The object of my present invention is to improve the construction and increase the efficiency of that class of devices by means of which when attached to vehicles the shaft of such vehicles are yieldingly supported.

Said invention will be first fully described and the novel features thereof then pointed out in the claims.

Referring to the accompanying drawings, which are made a part hereof, and on which similar reference characters indicate similar parts, Figure 1 is a side elevation of a shaft-support embodying my said invention as it appears when attached to a vehicle in position for use; Fig. 2, a top or plan view of the same; Fig. 3, a vertical sectional view as seen when looking in the direction indicated by the arrows from the dotted lines 3 3 in Figs. 1 and 2; Fig. 4, a detail elevation of the main housing member to which the springs are attached, and Fig. 5 a detail sectional view at the point indicated by the dotted line 5 5 in Figs. 1 and 2.

The axle 21, the clip 22, and shaft 23 are or may be of any ordinary or desired form or construction and not being peculiar to my present invention will not be further described herein except incidentally in describing said invention.

The main housing member 31 of my improved shaft-support is connected by ears 32 and 33 to the ears 24 on the clip 22 by means of a bolt 34, said ears being themselves connected to the member 31 by a bolt 35. Said main member 31 has a comparatively thick central portion, and annular grooves are formed on both sides thereof near the periphery. Extending through the body of said member substantially central of said grooves are a series of perforations, as is best shown in Fig. 4. The two springs 41 and 42 have inturned ends which enter from opposite sides and rest in one of said perforations, as best shown in Fig. 3. Said springs then preferably embody several coils and lead off to a suitable distance, where their ends are again turned toward each other, and these (when the parts are assembled) meet centrally in a roller 43. Two caps 44 and 45 bear against the outer sides of the coils of the spring and are held together by a bolt 46. These two spring-arms may also be held together at a point near the outer end (near where they carry the roller 43) by a tie 47 or otherwise.

As will be observed, my support, embodying, as it does, two coil-spring arms, one at each side, supports the shaft centrally and equally and has no tendency to tip or twist sidewise, as is the case with supports having one spring-arm only. The construction is very simple and the device is easy to operate, it being only necessary to place the springs in the annular grooves in the housing member 31, place the caps on the outer sides thereof, and insert the bolt, the roller having previously been placed on the opposite ends. The tension of these springs may be adjusted as required by shifting the inturned ends to the appropriate one of the perforations in the housing member.

Having thus fully described my said invention, what I claim as new, and desire to secure by Letters Patent, is—

1. The combination, in a shaft-support, of a central member having suitable perforations therein, two springs having inturned ends adapted to enter and meet in said perforations, caps, and a bolt for securing said springs in place.

2. The combination, in a shaft-support, of a central member having suitable perforations therein, two springs having inturned ends adapted to enter and meet in said perforations, caps, a bolt for securing said springs in place, and a roller carried by the inturned ends at the other ends of said spring-arms.

3. The combination, in a shaft-support, of a central housing member having annular grooves in its sides and perforations through the body thereof within said grooves, springs having their ends coiled and the extreme ends inturned toward each other, said inturned ends entering and meeting in said perforations, and suitable caps and a bolt for securing the parts together.

4. The combination, in a shaft-support, of a central member, two similar springs secured to the sides thereof and extending out thence to the predetermined point for supporting the shaft where they are inturned toward each other, a roller on said inturned ends, a tie holding the springs toward each other and preventing their escape from the roller, and means for securing said shaft-support to the vehicle structure.

5. The combination, in a shaft-support, of a housing member having a series of perforations parallel to the axis of movement and arranged around said axis, springs having ends adapted to enter said holes and to be shifted from hole to hole and thereby adjusted, and extending thence out and supporting the shaft, and suitable means for securing said springs to said housing in adjusted position.

In witness whereof I have hereunto set my hand and seal, at Indianapolis, Indiana, this 17th day of October, A. D. 1905.

SANFORD W. LANHAM. [L. S.]

Witnesses:
CHESTER BRADFORD,
JAMES A. WALSH.